Dec. 13, 1927.
J. WAHL ET AL
1,652,846
COMBINED WRENCH AND INFLATING MECHANISM
Filed March 13, 1926
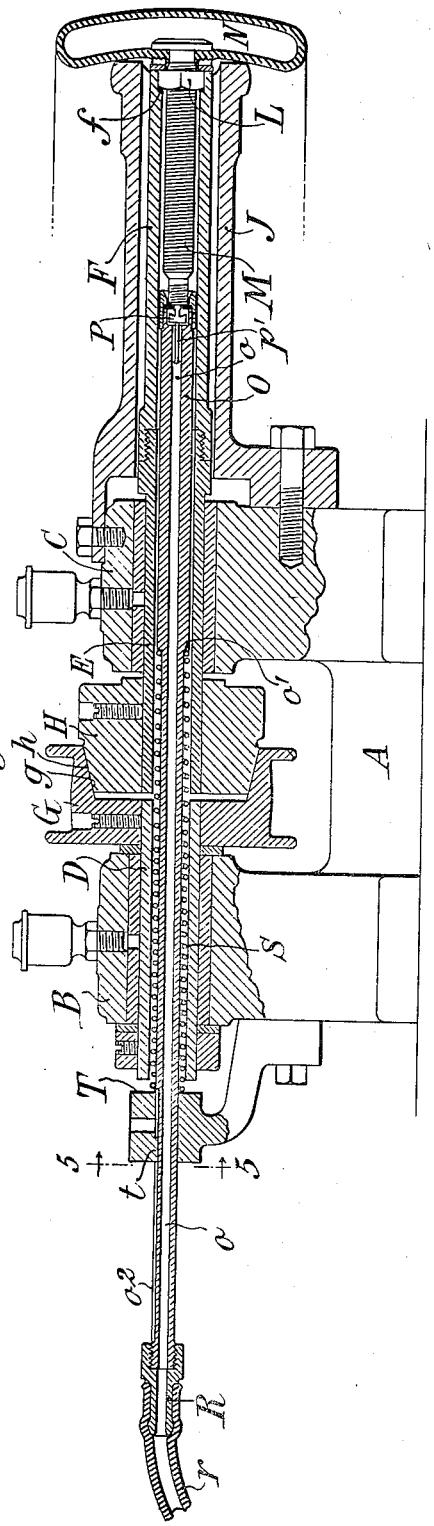
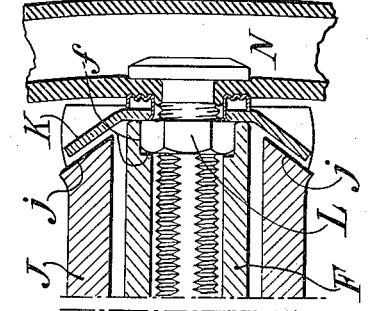
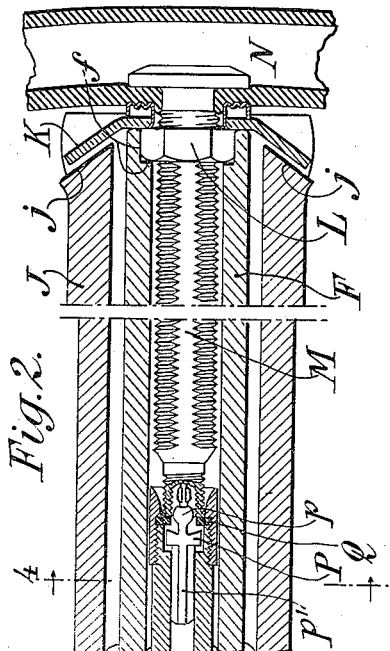
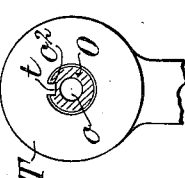
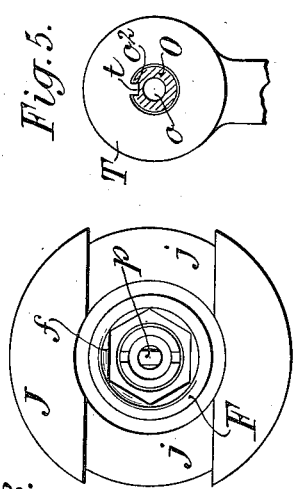
INVENTORS:
John Wahl and
Otto Melzer,
By Attorneys,
Fraser Myers & Manley Patented Dec. 13, 1927.

1,652,846

UNITED STATES PATENT OFFICE.

JOHN WAHL, OF ROSEDALE, AND OTTO MELZER, OF HOLLIS, NEW YORK, ASSIGNORS TO A. SCHRADER'S SON, INC., OF BROOKLYN, NEW YORK, A CORPORATION OF NEW YORK.

COMBINED WRENCH AND INFLATING MECHANISM.

Application filed March 13, 1926. Serial No. 94,626.

In the manufacture of inner tubes for pneumatic tires and the like, the tubes, after being fitted with conventional valve stems, are subjected to what is known as the "rack test". This consists in inflating the tubes under low pressure and leaving them on racks for about twenty-four hours, at the expiration of which time, if the tubes still remain inflated they are passed as satisfactory, and if deflated, they are rejected or subjected to further tests to determine their defects.

As is well known, the valve stems are secured to the inner tubes by inserting the enlarged head of the stem into the valve stem opening in the tube and clamping said tube between said valve head and a bridge washer by means of a clamping nut threaded down over the valve stem. Because of the length of the valve stems, the nuts are at present applied to the stems by power wrenches. After the stems are fitted to the tubes, the latter are subjected to the "rack test" before-mentioned. At present the threading of the nut on the valve stem and the inflation of the tube preparatory to subjecting it to the "rack test" constitute two separate operations.

According to the present invention, we provide a machine which will perform said two operations without rehandling of the valve stem or tire. A preferred embodiment of our machine consists of a wrench comprising a hollow and revoluble member having means to receive a nut to be applied to a threaded valve stem, and an inflating coupling within said hollow member having means for unseating the valve within the valve stem and allowing fluid under pressure to pass through said valve stem to the tire. The inflating operation may be performed either prior to threading the nut on the stem, simultaneously therewith or after the nut has reached the end of its journey on the stem, but in all events as part of a single handling operation. The invention also consists in other features of novelty which will be hereinafter more fully described.

A preferred embodiment of our invention is shown in the accompanying drawings, wherein Figure 1 is a longitudinal section of a machine embodying our invention, non-essential parts of said machine being shown in elevation.

Fig. 2 is a similar view on an enlarged scale of the wrench and inflating coupling of said machine.

Fig. 3 is an end elevation of Fig. 1, the tire and valve stem being removed.

Figs. 4 and 5 are sectional details taken on the lines 4—4 and 5—5, respectively.

Referring to the drawings, let A indicate a supporting member or frame having bearings B and C, in which are mounted hollow shafts D and E respectively. The shaft E is longitudinally aligned but axially spaced from the shaft D, and adapted for limited longitudinal movement with respect thereto, for a purpose which will hereinafter be more apparent. Carried by the shaft E and movable therewith is a hollow wrench member F, the free end of which is provided with a hexagonal socket $f$ adapted to receive a nut to be applied to a threaded valve stem.

The wrench member is rotatable through a drive mechanism which consists of clutch elements G and H, the former being a pulley fixed to the shaft D and provided with an internal conical face $g$, and the latter a member fixed to the shaft E and provided with a complemental conical face $h$. Normally, these clutch elements are out of engagement and adapted to be brought into clutching or driving engagement upon pressure being exerted upon the shaft E through the wrench F in an axial direction toward the pulley G.

Surrounding the wrench F is an enclosing casing J which is secured to the frame A, the free end of said casing terminating substantially flush with the free end of the wrench F and formed with diametrically opposite tapered sockets $j$ adapted to receive the wings of a bridge washer K while said bridge washer and a nut L are being applied to a valve stem M to secure the latter to an inner tube N. The bridge washer, which is formed with an opening (not shown) of similar cross-section to the valve stem M, when applied thereover and fitted with its wings in the recess J, will function to prevent rotation of the valve stem M while the nut L is being applied thereover, especially at the end of the journey of the nut L, where it is run up tightly against the bridge washer to clamp the latter to the inner tube.

Extending through the hollow shafts D and E is a member O provided with a longitudinal duct or passage o, the inner end of said member terminating in a tire valve coupling, preferably positioned concentrically with respect to the wrench socket f, comprising a valve P having a deflating pin p and guide rod p' and a packing gasket Q against which the valve P normally seats, and which also serves to provide a seal with the end of the valve stem M. The other end of the member O is provided with a nipple R, over which is fitted a flexible tube r leading to a source of fluid pressure. The member O is adapted for axial movement through the shafts D and E and is normally urged toward the socket member f by a spring S which encircles a reduced portion of the member O, one end of the spring seating against a shoulder o' and the other end against one face of a supplemental bearing T which serves to guide the member O in its movements and to prevent rotation thereof. For this latter purpose the member T is formed with a rib t engaging in a groove $o^2$ formed in the member O.

For the purpose of rendering efficient the operation of the machine, the bearings are provided with the customary anti-friction bushings and lubricators.

In the operation of the machine, the member O is normaly held at its innermost position by the spring S, the pulley G being rotated by any conventional source of power and the clutch elements separated. A hexagonal nut L is then placed in the socket f, and an inner tube having the enlarged head of a valve stem M fitted therein and a bridge washer K slipped over said stem, is grasped in the hand of the operator and the nipple end of the valve stem M is inserted through the nut L to bring the threads of said nut into engaging position with the threads on the valve stem. Upon axial pressure being applied to the nut through the valve stem M in the direction of the pulley G, the clutch element H is caused to engage with the pulley G, which causes rotation of the wrench F which runs the nut down over the valve stem. Upon the insertion of the valve nipple through the nut or after the nut proceeds over the valve stem, the nipple end of said stem is brought into engagement with the packing Q of the coupling and the deflating pin p, whereupon the valve with the valve stem and the valve P are unseated to permit fluid under pressure to enter the tube N. When the nut L reaches the end of its journey and the wings of the bridge washer engage in the sockets j, all further tendency of the wrench F to rotate is resisted, whereupon a slipping action takes place between the clutch elements G and H. In practice, however, an operator can tell by the "feel" or rotational strain when the nut L has reached the end of its journey, at which time the inflated tube and stem are removed from the wrench member by merely withdrawing the valve stem from said wrench member.

While we have shown and described a preferred embodiment of our invention, we do not wish to be limited to the specific construction disclosed, since it will be understood that various modifications thereof may be resorted to without departing from the spirit of the invention. For example, we do not wish to be limited to the specific arrangement of the inflating coupling or the time at which it functions to inflate the tire, so long as said inflating action and nut threading on operations are accomplished through a single handling operation of the valve stem.

What we claim is:

1. In combination, a revoluble wrench comprising means to receive a nut to be applied to a threaded valve stem, and an inflating means within said wrench adapted to engage the valve stem when it is received within the revoluble wrench, the application of the nut to the valve stem being accomplished approximately simultaneously with the engagement of the valve stem by the inflating means.

2. In combination, a revoluble wrench comprising means to receive a nut to be applied to a threaded valve stem, and an inflating coupling within said wrench adapted to engage said valve stem to permit fluid to pass therethrough as the nut is applied to said valve stem, said inflating coupling being movable axially with respect to the wrench.

3. In combination, a wrench comprising a hollow revoluble member having means to receive a nut to be applied to a threaded valve stem, and an inflating coupling within the hollow member adapted to engage said valve stem to the rear of the means for receiving the nut to permit fluid to pass through said valve stem as the nut is applied to said valve stem.

4. In combination, a revoluble wrench comprising means to receive a nut to be applied to a threaded valve stem, and an inflating coupling within said wrench adapted to engage the valve stem to permit fluid to pass therethrough as the nut is applied to said valve stem, said coupling being positioned concentrically with respect to the means for receiving the nut.

5. In combination, a wrench comprising a hollow revoluble member having means to receive a nut to be applied to a threaded valve stem, an inflating coupling coaxially arranged within the hollow member adapted to engage said valve stem to the rear of the means for receiving the nut to permit fluid to pass through said valve stem as the nut is applied to said valve stem, said inflating coupling being movable with respect to the hollow members, and spring means pressing said inflating coupling toward the nut-receiving means.

6. In combination, a wrench comprising a hollow and revoluble member having means to receive a nut to be applied to a threaded valve stem, a driving member for the wrench normally disconnected therefrom and arranged for automatic connection by the pressure of the valve stem on the nut to rotate said wrench and apply the nut, and an inflating coupling within said hollow member having valve-unseating means adapted to unseat the valve within said valve stem and allow compressed air to pass through said valve stem as the nut is applied to said valve stem.

7. In combination, a wrench comprising a driven shaft, a hollow and revoluble member having means to receive a nut to be applied to a threaded valve stem, mating clutch elements, one on the shaft and the other on the hollow member, said clutch members being movable axially relatively to one another and adapted to be brought into engagement by the pressure of the valve stem on the nut, a tubular member within the driven shaft and hollow member movable axially with relation thereto, an inflating coupling carried by said tubular member at its ends adjacent the nut-receiving means on the hollow member, said inflating coupling being adapted to permit fluid to pass through said valve stem as the nut is applied to said valve stem, and spring means normally urging the inflating coupling toward said nut-receiving means.

In witness whereof, we have hereunto signed our names.

JOHN WAHL.
OTTO MELZER.